(12) United States Patent
Hadden et al.

(10) Patent No.: US 6,424,817 B1
(45) Date of Patent: Jul. 23, 2002

(54) DUAL-POLARITY LOW-NOISE BLOCK DOWNCONVERTER SYSTEMS AND METHODS

(75) Inventors: Ian Hadden, Camarillo; Bruce J. Buchan, Simi Valley, both of CA (US)

(73) Assignee: California Amplifier, Inc., Camarillo, CA (US)

(*) Notice: Subject to any disclaimer, the term of this patent is extended or adjusted under 35 U.S.C. 154(b) by 0 days.

(21) Appl. No.: 09/148,913

(22) Filed: Sep. 4, 1998

Related U.S. Application Data
(60) Provisional application No. 60/073,692, filed on Feb. 4, 1998.

(51) Int. Cl.[7] ................................ H04B 7/14
(52) U.S. Cl. ............... 455/3.02; 455/303; 455/317; 725/69
(58) Field of Search ............... 455/3.02, 12.1, 455/313, 323, 295, 296, 302, 310, 317, 20; 725/68, 69

(56) References Cited

U.S. PATENT DOCUMENTS

| | | | |
|---|---|---|---|
| 4,710,972 A | * 12/1987 | Hayashi et al. | 455/179.1 |
| 5,345,591 A | * 9/1994 | Tsurumaki et al. | 725/69 |
| 5,455,961 A | * 10/1995 | Nakagawa | 455/12.1 |
| 5,644,368 A | * 7/1997 | Natsume | 348/737 |
| 5,812,591 A | * 9/1998 | Shumaker et al. | 375/206 |
| 5,812,947 A | * 9/1998 | Dent | 455/427 |
| 5,959,592 A | * 9/1999 | Petruzzelli | 343/840 |
| 6,122,482 A | * 9/2000 | Green, Sr. et al. | 725/68 |

OTHER PUBLICATIONS

Baylin, Frank, et al., *Digital Satellite TV*, fifth edition, 1997, Baylin Publications, Boulder, CO, pp. 159–162.
Baylin, Frank, et al., *World Satellite TV and Scrambling Methods*, third edition, 1993, Baylin Publications, Boulder, CO, pp. 7–14.
Frank Baylin et al., Digital Satellite TV, Fifth Edition, Baylin Publications, Boulder, Colorado, 1997, pp. 159–162.
Frank Baylin et al., "World Satellite TV and Scrambling Methods", Third Edition, Baylin Publications, Boulder, Colorado, 1993, pp. 7–14.

* cited by examiner

*Primary Examiner*—Edward F. Urban
*Assistant Examiner*—Naghmeh Mehrpour
(74) *Attorney, Agent, or Firm*—Koppel, Jacobs, Patrick & Heybl

(57) ABSTRACT

Methods and systems are provided for spectrally separating first and second satellite signals that occupy a common frequency band with different first and second electromagnetic polarizations. These systems and methods facilitate the use of inexpensive single-cable distribution networks to simultaneously deliver all transmitted channels of a satellite communication system to a plurality of subscriber locations. In particular, a frequency-converter system is provided that includes first and second low-noise block downconverters whose outputs are coupled into an output diplexer. The low-noise block downconverters each have a downconverter mixer and a local oscillator that couples a local oscillator signal to the mixer but the local oscillator signals are sufficiently spaced apart to convert the first and second satellite signals to spectrally spaced first and second intermediate-frequency (IF) bands. The IF bands are isolated because they are spectrally separated. Accordingly, they can be combined in the diplexer and distributed to subscribers over an economical single-cable distribution network.

23 Claims, 4 Drawing Sheets

DUAL-POLARITY LOW-NOISE BLOCK DOWNCONVERTER SYSTEMS AND METHODS

CROSS REFERENCES TO RELATED APPLICATIONS

This application claims the benefit of U.S. Provisional Application Serial No. 60/073,692 which was filed Feb. 4, 1998.

BACKGROUND OF THE INVENTION

1. Field of the Invention

The present invention relates generally to low-noise block downconverters (LNBs) and more particularly to LNBs for satellite communication systems.

2. Description of the Related Art

Various satellite communication systems provide communication signals (e.g., television signals) directly to subscriber locations (e.g., homes, apartment houses and offices). In an exemplary system, a satellite radiates microwave signal beams (e.g., in C-band or Ku-band) and the satellite's transmit antennas are generally configured so that their transmit beams illuminate one or more predetermined coverage areas on the earth. In such a coverage area, the signals are received in a system subscriber's antenna and typically downconverted to an intermediate-frequency signal band before further downconversion and detection at a lower detection frequency.

Different satellite transmit frequency bands have been assigned in different regions of the world. An exemplary transmit band 11 is shown in the frequency plan 10 of FIG. 1A. Upon receipt, signals in this transmit band are typically block downconverted to a first intermediate-frequency (IF) band 12 and then selected channels are further downconverted to a second IF region 13 for demodulation. The second downconversion and demodulation are generally performed in an interface module such as an integrated receiver decoder (IRD).

Figure 1A:
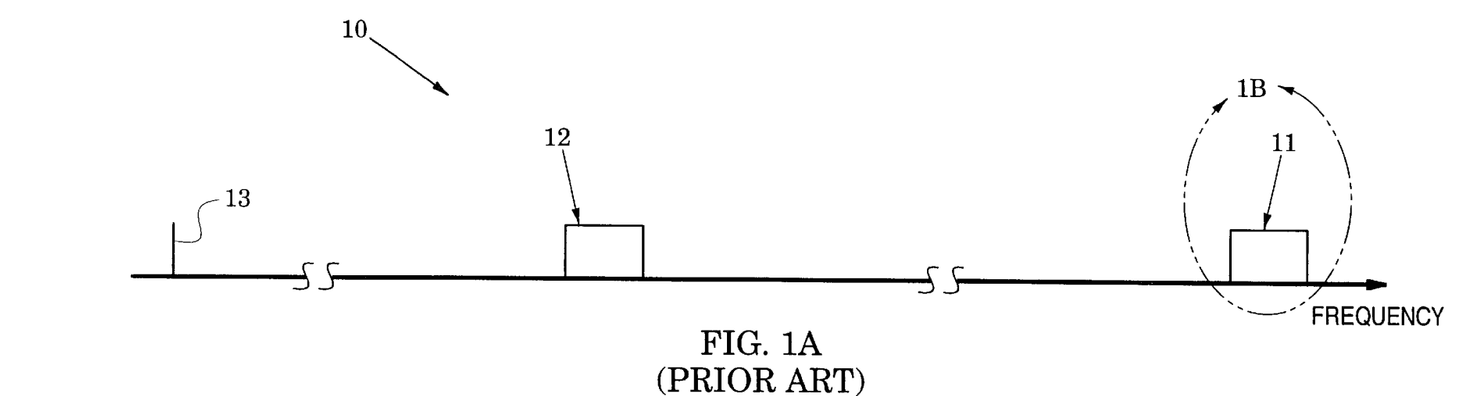
FIG. 1A is a frequency plan which shows exemplary transmit and downconverted frequency bands in a satellite communication system.
Figure 1B:
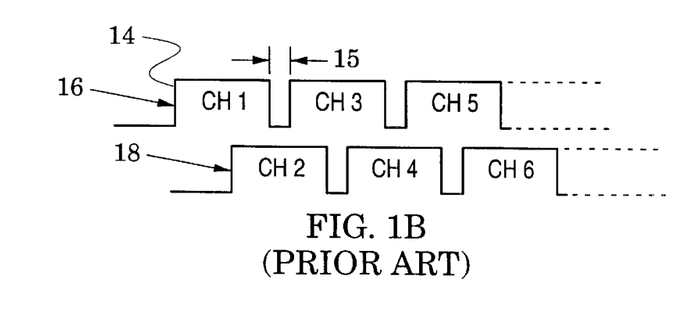
FIG. 1B is a enlarged view of the transmit band within the curved line 1B of FIG. 1A which illustrates transmitted channel sets.

As shown in FIG. 1B, the transmit band (11 in FIG. 1A) is generally divided into transmit channels 14 of various channel widths (e.g., between 6 and 40 MHz) and these transmit channels are typically separated in frequency by guard bands 15. To increase their number, the transmit channels are typically grouped in two channel sets 16 and 18 wherein each channel set basically spans the same transmit band. As indicated in FIG. 1B, channel isolation is enhanced by centering each channel of one set on a boundary between adjacent channels of the other set.

The channel sets are further isolated by transmitting one channel set with a selected electromagnetic polarization and transmitting the other channel set with a different electromagnetic polarization. For example, the channel sets can be transmitted with vertical and horizontal polarizations or with left-hand and right-hand circular polarizations. Essentially, polarization isolation facilitates a dual use of the transmit band.

The generic description above is realized with different specific communication system names, frequencies and signal polarizations in various parts of the world. Specific system names include direct broadcast systems (DBS); direct service satellite (DSS), direct to home (DTH) and fixed service satellite (FSS). Specific frequencies of the transmit band (11 FIG. 1A) include 11.7–12.2 GHz, 12.2–12.7 GHz and 12.25–12.75 GHz,. Specific frequencies of the first IF band (12 in FIG. 1A) include 950–1450 MHz and specific frequencies of the second IF region (13 in FIG. 1A) include 70 MHz. Specific signal polarizations include vertical and horizontal polarized signals and clockwise and counterclockwise polarized signals.

A polarization-sensitive antenna must be used to receive and detect the polarized channel sets of a satellite communication system. Once the transmitted signals are detected in an antenna, the polarization isolation is lost and must be replaced with other isolation measures in further processing and distribution of the IF signals.

In one conventional receiving system, the channel sets (16 and 18 in FIG. 1B) are detected on different probes of a polarization-sensitive antenna and a switch couples a selected one of the probes through a low-noise block downconverter (LNB). A subscriber's selection of a channel causes an IRD, for example, to direct the switch to a channel set that contains the selected channel.

Isolation between channel sets is maintained in this system because only lone detected channel set is directed into the LNB at any given time, i.e., the downconverted channel sets are isolated because they are temporally separated. Although temporal isolation facilitates the use of a single-cable distribution network and is satisfactory for providing television channels to a single television set, it forms a limited system for subscribers who have multiple television sets or for multisubscriber installations (e.g., apartment houses) because, at any given time, it restricts all viewers to use of a single channel set.

In another conventional receiving system, two LNBs are provided with a common local oscillator signal and each channel set is detected and passed through a respective one of the LNBs so that both channel sets are simultaneously available at the two LNB output ports, i.e., the downconverted channel sets are isolated because they are spatially separated. Although both channel sets are simultaneously available in this system, an expensive dual-cable distribution network and a switching system are generally required to distribute them to subscribers.

SUMMARY OF THE INVENTION

The present invention is directed to methods and systems that facilitate the use of inexpensive single-cable distribution networks to simultaneously deliver all transmitted communication channels of a direct broadcast satellite system to a plurality of subscriber locations.

These goals are realized with methods that spectrally separate first and second satellite signals which occupy a common frequency band with different first and second electromagnetic polarizations. In particular, these methods include the steps of guiding the first and second satellite signals respectively along first and second signal paths, translating the first and second satellite signals to different first and second intermediate-frequency bands and coupling the first and second satellite signals from the first and second signal paths to a common third signal path.

These goals are further realized with a frequency-converter system that includes first and second low-noise block downconverters whose outputs are coupled into an output diplexer. The low-noise block downconverters each have a downconverter mixer and a local oscillator that couples a local oscillator signal to the mixer but the local oscillator signals are sufficiently spaced apart to convert the first and second satellite signals to spectrally-spaced first and second intermediate-frequency (IF) bands. Because the IF bands are spectrally separated, they are isolated and can be combined in the diplexer and distributed to subscribers over an economical single-cable distribution network. A frequency-converter system embodiment includes a polarity-sensitive antenna such as a reflector and a feed horn that has orthogonally-arranged first and second probes which are respectively coupled to the first and second low-noise block downconverters.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 2:
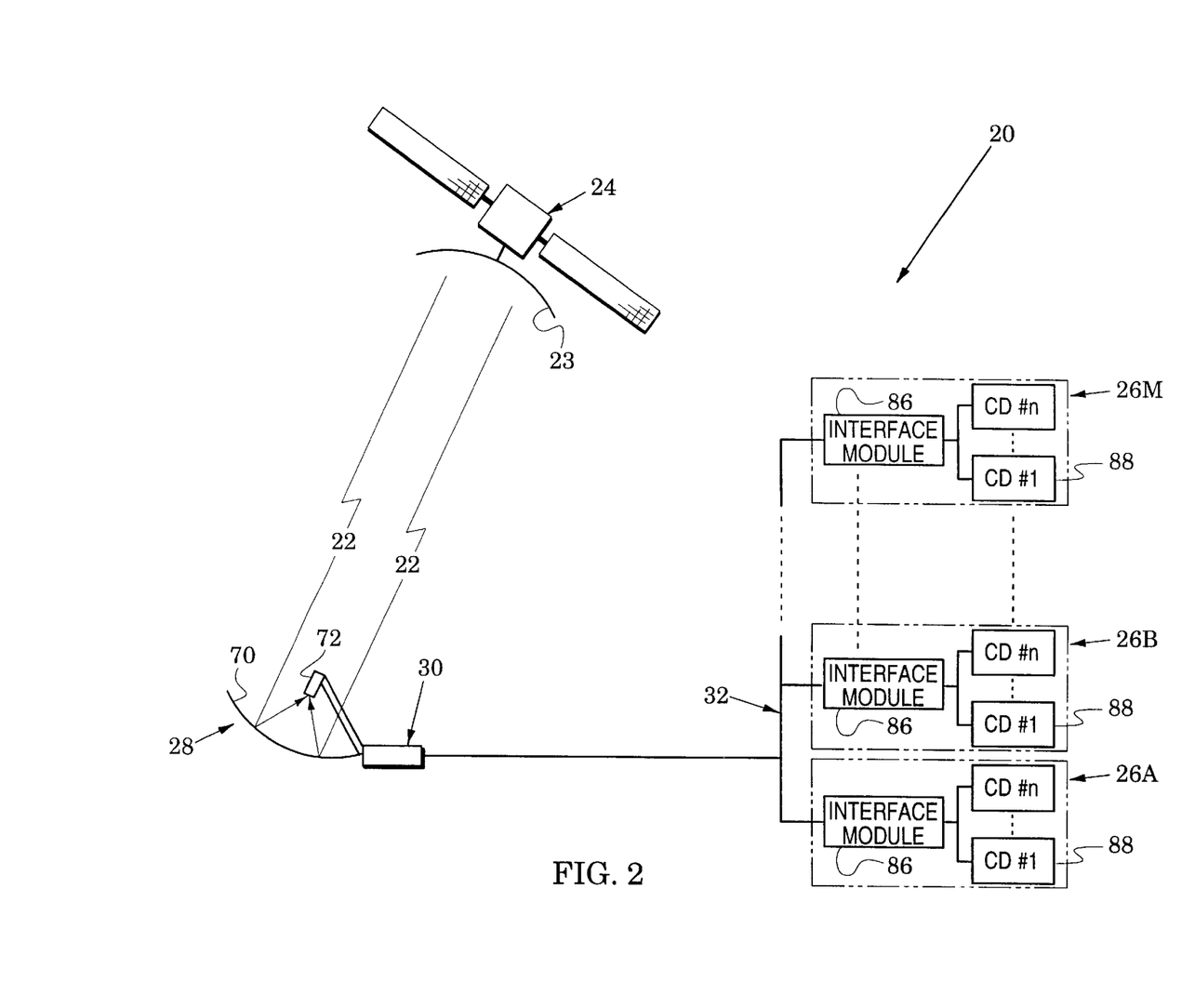
FIG. 2 is a diagram of a receiving and distribution system of the present invention.

FIG. 2 illustrates a receiving and distribution system 20 of the present invention that couples communication channels 22 from a satellite 24 to a plurality of subscriber locations 26A–26M. The system 20 includes an antenna 28, a frequency-converter system in the form of a dual-polarity low-noise block downconverter 30 and a single-cable distribution network 32. The novel structure of the dual-polarity LNB facilitates the use of an inexpensive single-cable distribution network 32 and simultaneously delivers all of the transmitted communication channels (16, 18 in FIG. 1B) to the subscriber locations 26A–26M.

Figure 3:
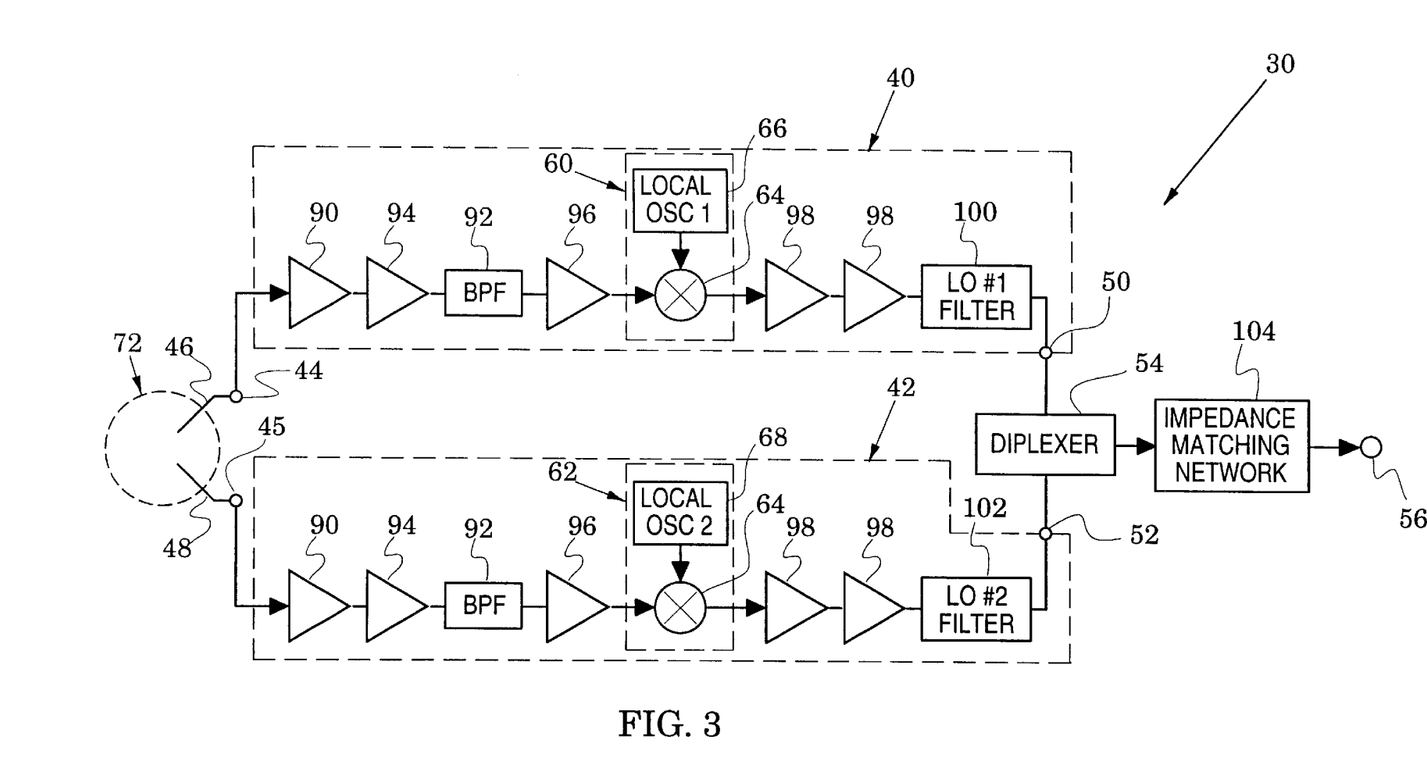
FIG. 3 is a block diagram of a dual-polarity low-noise block downconverter in the system of FIG. 2.

In particular, the dual-polarity low-noise block downconverter (LNB) 30 is shown in FIG. 3 to include a first LNB 40 and a second LNB 42 that are respectively coupled at their input ports 44 and 45 to probes 46 and 48. Output ports 50 and 52 of the LNB's 40 and 42 are coupled through a diplexer 54 to an output port. 56 which is connected in FIG. 2 to an input end of the distribution network 32.

The LNB's 40 and 42 respectively include downconverters 60 and 62 that each have a mixer 64. In the downconverter 60, its mixer 64 is fed by a first local oscillator 66 whose output signal has a first frequency. The mixer 64 of the second downconverter 62 is fed by a second local oscillator 68 whose output signal has a second frequency that is different from the first frequency.

In FIG. 2, the signals of the communication channels (16, 18 in FIG. 1B) are directed from an antenna in the form of a reflector 70 to a feed horn 72. The feed horn is generally part of the LNB 30 and, accordingly, it is also shown in broken lines in FIG. 3 where it receives the probes 46 and 48. The probes are orthogonally-arranged so that they detect orthogonally-arranged polarizations. For example, the probe 46 can be aligned with a vertically-polarized satellite signal and the probe 48 aligned with a horizontally-polarized satellite signal. In this example, the probes 46 and 48 would respectively detect the channel sets 16 and 18 of FIG. 1B.

Figure 4:
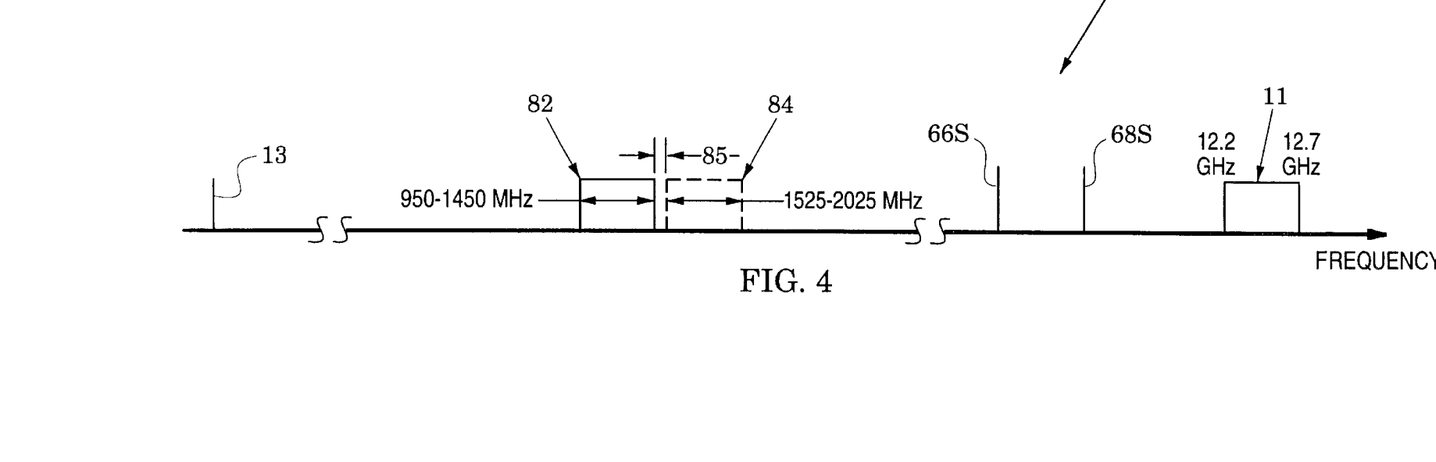
FIG. 4 is a diagram that is similar to FIG. 1A and which illustrates exemplary transmit and downconverted frequency bands in the system of FIG. 2.

An operational description of the dual-polarity LNB 30 is facilitated by reference to the exemplary frequency plan 80 of FIG. 4. For description purposes, it is assumed that the satellite communication system signals 22 of FIG. 2 occupy a transmit band 11 of 12.2–12.7 GHz and that they contain the channel sets 14 and 16 of FIG. 1B. For this description, it is also assumed that the signal frequencies of the local oscillators 66 and 68 of FIG. 3 are respectively set to exemplary frequencies of 11.25 GHz and 10.675 GHz. In FIG. 4, these local oscillator signals are respectively indicated as 66S and 68S.

Accordingly, the vertically-polarized channels (14 in FIG. 1B) are detected by the probe 46 and coupled through the LNB 40 where they are downconverted in the downconverter 60 to a downconverted IF band 82 in FIG. 4 of 950–1450 MHz (similar to the band 12 of FIG. 1A). Simultaneously, the horizontally-polarized channels (16 in FIG. 1B) are detected by the probe 48 and coupled through the LNB 42 where they are downconverted in the downconverter 62 to the 1525–2025 MHz downconverted IF band 84 of FIG. 4. The local oscillator frequencies have been chosen to spectrally separate IF bands 82 and 84 as indicated by the frequency space 85. In FIG. 3, the spectrally-separated IF bands 82 and 84 are then coupled through the diplexer 54 to the output port 56.

Because the channel sets 14 and 16 of FIG. 1B have been spectrally separated, they can be carried on the single-cable distribution system 32 of FIG. 2 and can simultaneously provide both channel sets to the subscriber locations 26A–26M. This is in contrast to dual-cable distribution networks and switching systems that are required in conventional receiving systems in which the channel sets 14 and 16 are isolated by spatial separation. And in contrast to conventional receiving systems in which the channel sets 14 and 16 are isolated by temporal separation, the dual-polarity low-noise block downconverter (LNB) 30 provides all channel sets at all times to satellite communication system subscribers.

As shown in FIG. 2, the single-cable distribution system is coupled, in each of the subscriber locations 26A–26M, to an interface module 86. The interface modules may be wide band IRDs which can accept signals in the IF bands 82 and 84 of FIG. 4. IRDs typically include downconverting, tuning, and discriminating circuits and may also include modulating circuits that adapt their output, signals to those required by various communication devices 88 (e.g., multiple television sets) which are designated CD#1–CD#n in FIG. 2.

Alternatively, the IRDs may be of a narrow band type which can only accept one of the IF bands 82 and 84. In this case, the interface modules 86 also include provisions for frequency converting one of the IF bands so that both bands occupy a common frequency band that is compatible with the narrow band IRD. A switch must also be provided by the interface module for selection of a desired channel set.

FIG. 3 shows that the LNB 40 also includes a low-noise amplifier (LNA) 92, and an RF bandpass filter 92 that are coupled between the input port 44 and the mixer 64. Noise figure is enhanced by having the LNA 90 precede the RF filter 92. In other LNB embodiments of the invention, however the RF filter precedes the LNA so as to protect it from out-of-band signals (e.g., image signals). Preferably, the RF filter 92 is positioned between additional RF amplifier stages 94 and 96. The LNB 40 also includes at least one IF amplifier 98 that is positioned between the mixer 64 and the output port 50.

The same RF and IF amplifiers and filters are also included in the LNB 42. In addition, local oscillator filters 100 and 102 precede the output ports 50, and 52 of the LNBs 40 and 42. These filters inhibit signal transmission from one of the local oscillators 100 and 102 to the mixer associated with the other of the local oscillators. For example, the filter 100 can be a trap filter set to the frequency of local oscillator 68 and the filter 102 can be a trap filter set to the frequency of local oscillator 66. These isolation filters inhibit crosstalk between the converters 60 and 62 and reduce spurious signals in the spectrally-separated IF bands 82 and 84 of FIG. 4.

An impedance matching network 104 is preferably positioned after the diplexer 54 to provide an impedance match to an impedance (e.g., 75 ohms) of the distribution network 32 of FIG. 2.

Figures 5, 6, 7:
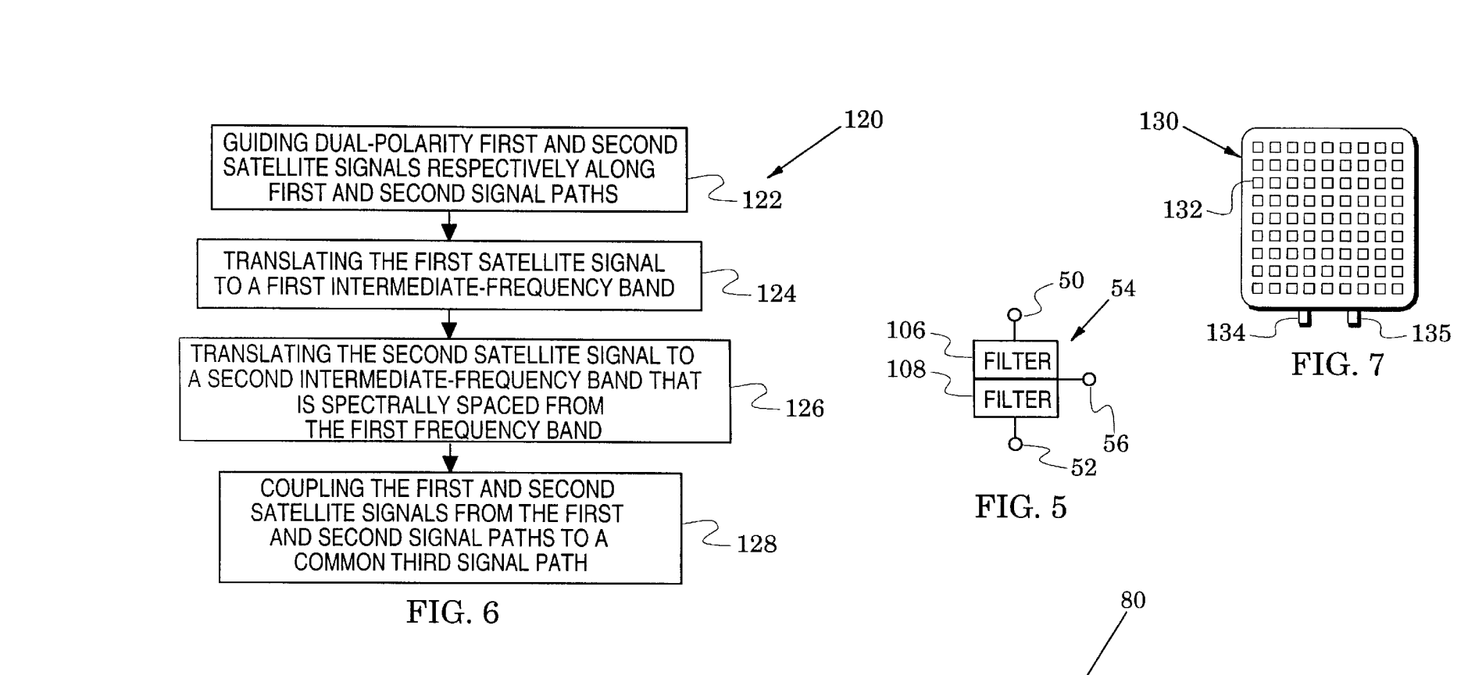
FIG. 5 is a block diagram of a diplexer embodiment in the downconverter of FIG. 3.
FIG. 6 is a flow chart which illustrates process steps in the dual polarity low-noise block downconverter of FIG. 3.
FIG. 7 is a front plan view of another antenna embodiment in the system of FIG. 2.

FIG. 5 shows an exemplary realization of the diplexer 54 that includes a first filter 106 that is positioned between the output port 50 (of the LNB 40 of FIG. 3) and the output port 56 and a second filter 108 that is positioned between the output port 52 (of the LNB 42 of FIG. 3) and the output port 56. The filter 106 is configured to pas signals in the IF band 82 of FIG. 4 and attenuate signals in the IF band 84. In contrast, the filter 108 is configured to pass signals in the IF band 84 and attenuate signals in the IF, band 82. These goals can be effected with a diplexer embodiment of first and second bandpass filters, an embodiment of a low-pass filter and a high-pass filter and embodiments that include various other combinations of these filter types.

The structure of FIG. 3 converts dual-polarity satellite communication system signals to spectrally-separated IF bands. This conversion process is summarized in the flow chart 120 of FIG. 6.

In a first process step 122, first and second satellite signals are respectively guided along first and second signal paths. This guiding step includes the step of detecting the dual-polarity signals.

In subsequent process steps 124 and 126, the first satellite signal signal is frequency translated to a first intermediate-frequency band and the second satellite signal is frequency translated to a second intermediate-frequency band that is spectrally spaced from the first frequency band. The first and second satellite signals can then be coupled from the first and second signal paths to a common third signal path in a final step 128. The third signal path now carries spectrally-separated intermediate frequency satellite signals and be coupled to the single-cable distribution network 32 of FIG. 2.

Although the invention has been illustrated with an antenna in the form of a reflector, the teachings of the invention can be practiced with various dual-polarity antennas. For example, the planar antenna 130 of FIG. 7 has a plurality of microstrip patches 132 that receive dual-polarity signals and deliver them to dual output ports 134 and 135. In this antenna, each patch can be accessed at a patch portion that will couple signals out of that patch with a desired polarization (e.g., vertical or horizontal).

The teachings of the invention can be practiced with various conventional combinations of antenna, probe and feed structures that are suitable for receiving and detecting differently-polarized satellite signals (e.g., vertical and horizontal polarized signals and clockwise and counterclockwise polarized signals).

The teachings of the invention are directed to the conversion of dual-polarity satellite communication signals to spectrally-separated intermediate frequency signal bands (e.g., bands 82 and 84 of FIG. 4) which can be carried over a single-cable distribution system. These teachings can be practiced with a variety of frequency plans such as the exemplary plans recited in the background of the invention.

The preferred embodiments of the invention described herein are exemplary and numerous modifications, variations and rearrangements can be readily envisioned to achieve a substantially equivalent results, all of which are intended to be embraced within the spirit and scope of the invention, as defined in the appended claims.

We claim:

1. A downconverter system which reduces spurious signals as it downconverts first and second polarized satellite signals that occupy a common frequency band to thereby form combined communication signals, the system comprising:

first and second probes arranged to respectively detect said first and second polarized signals and process them to first and second detected signals;

first and second local oscillators that respectively provide a first local oscillator (LO) signal and a second LO signal that is spectrally spaced from said first LO signal;

a first low-noise block downconverter that has a first mixer which responds to said first LO signal and downconverts said first detected signals to first downconverted signals in a first frequency band that is at least two octaves below said first and second LO signals;

a second low-noise block downconverter that has a second mixer which responds to said second LO signal and downconverts said second detected signals to second downconverted signals in a second frequency band that is spectrally spaced from said first frequency bald and is at least two octaves below said first and second LO signals;

a diplexer that combines said first and second downconverted signals to form said combined communication signals;

a first intermediate-frequency (IF) filter coupled between said first mixer and said diplexer and configured to pass said first downconverted signals in said first frequency band and attenuate said second dow converted signals in said second frequency band;

a second IF filter coupled between said second mixer and said diplexer and configured to pass said second downconverted signals in said second frequency band and attenuate said first downconverted signals in said first frequency band;

a first LO isolation filter set to the frequency of said second LO signal and coupled between said first mixer and said diplexer to inhibit passage of said second LO signal to said first mixer;

and a second LO isolation filter set to the frequency of said first LO signal and coupled between said second mixer and said diplexer to inhibit passage of said first LO signal to said second mixer;

said first and second LO isolation filters thus inhibiting crosstalk between said first and second mixers to thereby reduce spurious signals in said combined communication signals.

2. The downconverter system of claim 1, wherein said first and second probes are orthogonally arranged.

3. The downconverter system of claim 2, further including an antenna that is configured to receive said first and second polarized signals and deliver them to said first and second probes.

4. The downconverter system of claim 1, wherein said common frequency band is substantially 12.2–12.7 GHz, said first LO signal has a frequency of substantially 11.25 GHz, said second LO signal has a frequency of substantially 10.675 GHz, said second LO isolation filter is a trap filter set to substantially 11.25 GHz and said first LO isolation filter is a trap filter set to substantially 16.675 GHz.

5. The downconverter system of claim 1, wherein said common frequency band is substantially 12.2–12.7 GHz, said first LO signal has a frequency of substantially 11.25 GHz and said second LO signal has a frequency of substantially 10.675 GHz and wherein said first IF filter passes signals in the range of 950–1450 MHz and attenuates signals in the range of 1525–2025 MHz and said second IF filter passes signals in the range of 1525–2025 MHz and attenuates signals in the range of 950–1450 MHz.

6. The downconverter system of claim 1, wherein:
said first low-noise block downconverter further includes:
a) a low-noise amplifier that amplifies said first detected signals;
b) a bandpass filter that passes said first detected signals; and
c) an amplifier that amplifies said first downconverted signals;
and said second low-noise block downconverter further includes:
a) a low-noise amplifier that amplifies said second detected signals;
b) a bandpass filter that passes said second detected signals; and
c) an amplifier that amplifies said second downconverted signals.

7. The downconverter system of claim 1, wherein said first LO isolation filter is a trap filter set to the frequency of said second LO signal and said second LO isolation filter is a trap filter set to the frequency of said first LO signal.

8. The downconverter system of claim 1, wherein said first and second isolation filters, are included in said diplexer.

9. A method for reducing spurious signals as polarized satellite communication signals that occupy a common frequency band are downconverted to form combined communication signals, comprising the steps of:
detecting said polarized signals with first and second probes to generate first and second detected signals;
in a first mixer, mixing said first detected signals with a first local oscillator (LO) signal to generate first downconverted signals;
in a second mixer, mixing said second detected signals with a second LO signal that is spectrally spaced from said first LO signal to generate second downconverted signals that are spectrally spaced from said first downconverted signals wherein said first and second downconverted signals are at least two octaves below said first and second LO signals;
in a first, signal path following said first mixer, passing said first downconverted signals and attenuating said second downconverted signals with a first intemediate-frequency (IF) filter;
in a second signal path following said second mixer, passing said second downconverted signals and attenuating said first downconverted signals with a second IF filter;
in said first signal path, providing a first LO isolation filter set to the frequency of said second LO signal to inhibit passage of said second LO signal;
in said second signal path, providing a second LO isolation filter set to the frequency of said first LO signal to inhibit passage of said second LO signal; and
at terminations of said first and second signal paths, combining said first and second downconverted signals to form said combined communication signals;
crosstalk between said first and second mixers thus inhibited by said second and first LO isolation filters to thereby reduce spurious signals in said combined communication signals.

10. The method of claim 9, further including the step of distributing said combined communication signals over a single-cable distribution network.

11. The method of claim 9, wherein:
said common frequency band is substantially 12.2–12.7 GHz;
said first and second LO signals have frequencies respectively of substantially 11.25 GHz and 10.675 GHz; and
said first and second LO isolation filters are first and second trap filters respectively set to substantially 10.675 and 11.25 GHz.

12. The method of claim 9, wherein said first LO isolation filter is a trap filter set to the frequency of said second LO signal and said second LO isolation filter is a trap filter set to the frequency of said first LO signal.

13. A communication system which reduces spurious signals as it downconverts and distributes polarized satellite signals to a plurality of system subscribers wherein said polarized satellite signals occupy a common frequency band, comprising:
a dual-polarity antenna that receives first and second polarized signals;
a downconverter that includes:
a) first and second probes arranged to respectively detect said first and second polarized signals and process them to first and second detected signals;
b) first and second local oscillators that respectively provide a first local oscillator (LO) signal and a second LO signal that is spectrally spaced from said first LO signal;
c) a first low-noise block downconverter that has a first mixer which responds to said first LO signal and downconverts said first detected signals to first downconverted signals in a first frequency band that is at least two octaves below said first and second LO signals;
d) a second low-noise block downconverter that has a second mixer which responds to said second LO signal and downconverts said second detected signals to second downconverted signals in a second frequency band that is spectrally spaced from said first frequency band and is at least two octaves below said first and second LO signals;
e) a diplexer that combines said first and second downconverted signals to form said combined communication signals:
f) a first intemediate-frequency (IF) filter coupled between said first mixer and said diplexer and configured to pass said first downconverted signals in said first frequency band and attenuate said second downconverted signals in said second frequency band; and
g) a second IF filter coupled between said second mixer and said diplexer and configured to pass said second downconverted signals in said second frequency band and attenuate said first downconverted signals in said first frequency band;

h) a first LO isolation filter set to the frequency of said second LO signal and coupled between said first mixer and said diplexer to inhibit passage of said second LO signal to said first mixer; and i) a second LO isolation filter set to the frequency of said first LO signal and coupled between said second mixer and said diplexer to inhibit passage of said first LO signal to said second mixer;

a single able distribution network that distributes said combined communication signals to said subscribers; and an impedance matching network configured to provide an impedance match between said diplexer and said distribution network;

said first and second LO isolation filters thus inhibiting crosstalk between said first and second mixers to thereby reduce spurious signals in said combined communication signals.

14. The system of claim 13, wherein:

said first low-noise block downconverter further includes:
a) a low-noise amplifier that amplifies said first detected signals;
b) a bandpass filter that passes said first detected signals; and
c) an amplifier that amplifies said first downconverted signals;

and said second low-noise block downconverter further includes:
a) a low-noise amplifier that amplifies said second detected signals;
b) a bandpass filter that passes said second detected signals; and
c) an amplifier that amplifies said second downconverted signals.

15. The system of claim 13, wherein said common frequency band is substantially 12.2–12.7 GHz, said first LO signal has a frequency of substantially 11.25 GHz, said second LO signal has a frequency of substantially 10.675 GHz, said second LO isolation filter is a trap filter set to substantially 11.25 GHz and said first LO isolation filter is a trap filter set to substantially 10.675 GHz.

16. The system of claim 13, wherein said common frequency band is substantially 12.2–12.7 GHz, said first LO signal has a frequency of substantially 11.25 GHz and said second LO signal has a frequency of substantially 10.675 GHz and wherein said first IF filter passes signals in the range of 950–1450 MHz and attenuates signals in the range of 1525–2025 MHz and said second IF filter passes signals in the range of 1525–2025 MHz and attenuates signal In the range of 950–1450 MHz.

17. The system of claim 13, further including a plurality of interface modules that terminate said single-cable distribution network and provide said combined communication signals to said subscribers.

18. The system of claim 13, wherein said first LO isolation filter is a trap filter set to the frequency of said second LO signal and said second/LO isolation filter is a trap filter set to the frequency of said first LO signal.

19. The Communication system of claim 13, wherein said first and second isolation filters are included in said diplexer.

20. A downconverter for reduction of spurious signals in the downconversion of orthogonally-polarized satellite signals that occupy a common frequency band, comprising:

orthogonally-arranged first and second probes for respective detection of said, first and second orthogonally-polarized satellite signals;

a diplexer that has an output port for delivery of downconverted satellite signals;

a first mixer that is coupled between said first probe and said diplexer;

a first local oscillator that drives said first mixer to downconvert satellite signals to a first intermediate-frequency (IF) band that is spaced at least two octaves below the frequency of said first local oscillator;

a second mixer that is coupled between said second probe and said diplexer;

a second local oscillator that drives said second mixer to downconvert satellite signals to a second IF band that is different from said first IF band and that is spaced at least two octaves below the frequency of said second local oscillator;

a first IF filter that is coupled between said first mixer and said output port to pass signals in said first IF band and attenuate signals in said second IF band;

a second IF filter that is coupled between said second mixer and said output port to pass signals in said second IF band and attenuate signals in said first IF band;

a first isolation filter that is coupled between said first mixer and said diplexer and is set to the frequency of said second local oscillator to thereby inhibit signal transmission from said second local oscillator to said first mixer; and a second isolation filter that is coupled between said second mixer and said diplexer and is set to the frequency of said first local oscillator to thereby inhibit signal transmission from said first local oscillator to said second mixer;

said first and second isolation filters inhibiting crosstalk between said first and second local oscillators and thereby reducing spurious signals at said output port.

21. The downconverter of claim 20, wherein said first and second isolation filters are first and second trap filters.

22. The downconverter of claim 20, wherein said common frequency band is substantially 12.2–12.7 GHz, said frequency of said first local oscillator is substantially 11.25 GHz and said frequency of said second local oscillator is substantially 10.675 GHz.

23. The downconverter of claim 20, wherein said first and second isolation filters are included in said diplexer.

* * * * *

UNITED STATES PATENT AND TRADEMARK OFFICE
CERTIFICATE OF CORRECTION

PATENT NO. : 6,424,817 B1
DATED : July 23, 2002
INVENTOR(S) : Ian Hadden and Bruce J. Buchan Page 1 of 1

It is certified that error appears in the above-identified patent and that said Letters Patent is hereby corrected as shown below:

Column 4,
Line 15, change "11.25 GHz and 10.675 GHz" to -- 10.675 GHz and 11.25 GHz --.
Line 64, change "(LNA) 92" to -- (LNA) 90 --.

Column 5,
Line 52, change "and be" to -- and can be --.

Signed and Sealed this

Nineteenth Day of November, 2002

*Attest:*

JAMES E. ROGAN
*Attesting Officer*  *Director of the United States Patent and Trademark Office*